(12) United States Patent
Chuang et al.

(10) Patent No.: US 11,760,220 B2
(45) Date of Patent: Sep. 19, 2023

(54) CHARGE DEVICE AND CHARGING SYSTEM

(71) Applicant: PEGATRON CORPORATION, Taipei (TW)

(72) Inventors: Hsin-Lin Chuang, Taipei (TW); Wen-Chang Chuang, Taipei (TW)

(73) Assignee: PEGATRON CORPORATION, Taipei (TW)

( * ) Notice: Subject to any disclaimer, the term of this patent is extended or adjusted under 35 U.S.C. 154(b) by 325 days.

(21) Appl. No.: 17/135,765

(22) Filed: Dec. 28, 2020

(65) Prior Publication Data

US 2021/0237600 A1 Aug. 5, 2021

(30) Foreign Application Priority Data

Feb. 4, 2020 (TW) .................................. 109103423

(51) Int. Cl.
| | |
|---|---|
| *B60L 53/35* | (2019.01) |
| *G05D 1/00* | (2006.01) |
| *G05D 1/02* | (2020.01) |
| *H02J 7/00* | (2006.01) |

(52) U.S. Cl.
CPC ............ *B60L 53/35* (2019.02); *G05D 1/0088* (2013.01); *G05D 1/0225* (2013.01); *H02J 7/0042* (2013.01)

(58) Field of Classification Search
CPC ....... B60L 53/35; G05D 1/0088; H02J 7/0042
USPC .......................................................... 320/109
See application file for complete search history.

(56) References Cited

U.S. PATENT DOCUMENTS

| | | | |
|---|---|---|---|
| 11,279,253 B2* | 3/2022 | Flechl | B60L 53/30 |
| 2020/0164758 A1* | 5/2020 | Flechl | B60L 53/16 |
| 2021/0001737 A1* | 1/2021 | Hoess | H01R 13/5213 |
| 2022/0069594 A1* | 3/2022 | Chuang | H02J 7/0042 |
| 2022/0258630 A1* | 8/2022 | Paterson | B60L 53/18 |

FOREIGN PATENT DOCUMENTS

| | | |
|---|---|---|
| CN | 207166187 | 3/2018 |
| TW | I377742 | 11/2012 |

OTHER PUBLICATIONS

"Office Action of Taiwan Counterpart Application", dated Nov. 3, 2020, p. 1-p. 4.

* cited by examiner

*Primary Examiner* — Suchin Parihar
(74) *Attorney, Agent, or Firm* — J.C. PATENTS

(57) ABSTRACT

A charge device, including a fixing base, a charging arm pivoting lever, and a pivoting lever, is provided. The charging arm includes a first end portion and a second end portion. The pivoting lever includes a first portion and a second portion, and the first portion is pivotally connected to the fixing base. The pivoting lever is adapted to rotate relative to the fixing base, the second portion is pivotally connected to the first end portion, and the charging arm is adapted to rotate relative to the pivoting lever. A charging system is also provided.

10 Claims, 11 Drawing Sheets

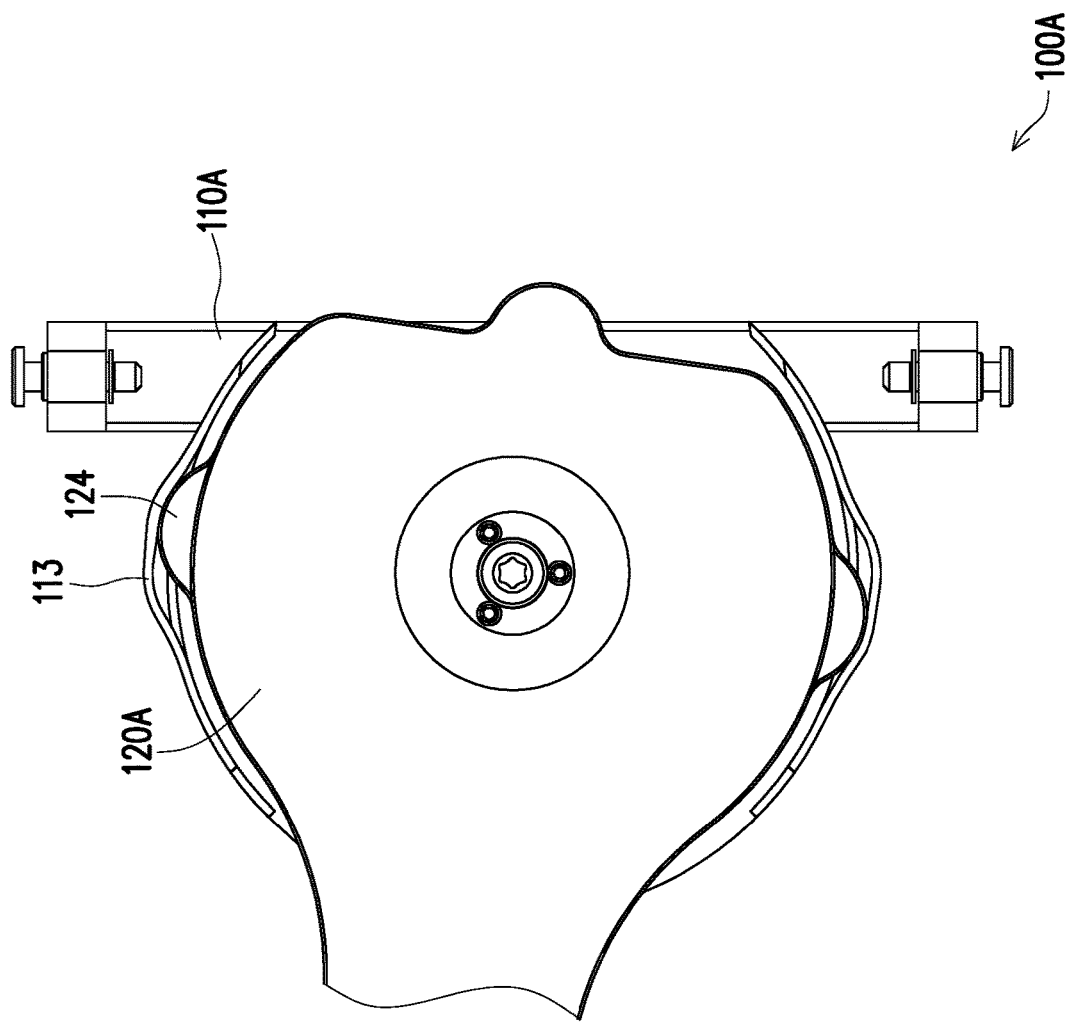

CHARGE DEVICE AND CHARGING SYSTEM

CROSS-REFERENCE TO RELATED APPLICATION

This application claims the priority benefit of Taiwan application serial no. 109103423, filed on Feb. 4, 2020. The entirety of the above-mentioned patent application is hereby incorporated by reference herein and made a part of this specification.

BACKGROUND

Technical Field

This disclosure relates to a charge device and a charging system, in particular to a charge device and a charging system related to an autonomous mobile device.

Related Art

In general, an autonomous mobile device is paired with a charge device for recharging. The charge device is usually set up at a location, and the autonomous mobile device is able to automatically move to the location to dock with the charge device for charging.

However, when the autonomous mobile device is in the process of moving to the charge device, there may be an offset generated between the autonomous mobile device and the charge device, which often results in the autonomous mobile device being unable to smoothly align with the charge device, or even being stuck.

SUMMARY

This disclosure provides a charge device, which is able to have a larger mobility to smoothly align with an autonomous mobile device.

The disclosure provides a charging system, which includes the charge device.

The charge device of the disclosure includes a fixing base, a charging arm, and a pivoting lever. The charging arm includes a first end portion and a second end portion opposite to each other. The pivoting lever includes a first portion and a second portion. The first portion is pivotally connected to the fixing base. The pivoting lever is adapted to rotate relative to the fixing base. The second portion is pivotally connected to the first end portion, and the charging arm is adapted to rotate relative to the pivoting lever.

In an embodiment of the disclosure, the fixing base further includes at least one elastic deformation portion. The pivoting lever includes at least one ear portion, and the ear portion is engaged with the corresponding elastic deformation portion. When the pivoting lever rotates relative to the fixing base, the elastic deformation portion is pressed by the ear portion to generate an elastic force for the pivoting lever to return to an original position.

In an embodiment of the disclosure, one of the first end portion of the charging arm and the second portion of the pivoting lever includes a sliding portion, while the other includes a position-limiting slot. The sliding portion extends into the position-limiting slot and is adapted to move along the position-limiting slot to limit a rotational angle of the charging arm relative to the pivoting lever.

In an embodiment of the disclosure, the fixing base includes a bottom plate and a first shaft protruding from the bottom plate. The first portion of the pivoting lever is pivotally connected to the fixing base through the first shaft. The first end portion of the charging arm includes a second shaft. The second portion of the pivoting lever is pivotally connected to the charging arm through the second shaft. An extension direction of the first shaft is parallel to an extension direction of the second shaft.

In an embodiment of the disclosure, the charging arm includes two opposite side walls located at the second end portion, and an electrical connection portion at each side wall.

The charging system of the disclosure includes a charge device and an autonomous mobile device. The charge device includes a fixing base, a pivoting lever, and a charging arm. The pivoting lever includes a first portion and a second portion, and the first portion is pivotally connected to the fixing base. The charging arm includes a first end portion and a second end portion opposite to each other, and the first end portion is pivotally connected to the second portion. The autonomous mobile device is adapted to be electrically connected to the charging arm. When the autonomous mobile device is in a process of being docked to the second end portion of the charging arm, the charging arm is adapted to rotate relative to the pivoting lever, and the pivoting lever is adapted to rotate relative to the fixing base, so that the charge device is aligned with the autonomous mobile device.

In an embodiment of the disclosure, the charging arm includes two opposite side walls at the second end portion, and an electrical connection portion at each side wall. The autonomous mobile device includes two electrode modules opposite to each other. The two electrode modules constitute a track. The second end portion of the charging arm is adapted to extend into the track, so that each electrode module is respectively electrically connected to the corresponding electrical connection portion.

In an embodiment of the disclosure, each of the electrode modules further includes a casing base and an electrode portion. The casing base includes an opening facing the track and multiple wall surfaces surrounding the opening. The electrode portions are adjustably configured at the opening. Each of the electrode portions and the corresponding wall surface W have multiple gaps between them. When the second end portion of the charging arm extends into the track of the autonomous mobile device, the electrical connection portions of the charging arm press against the electrode portions of the autonomous mobile device to change a size of the gaps.

In an embodiment of the disclosure, the track includes an entrance end to allow the second end portion of the charging arm to extend into, the electrode portion includes an inclined surface facing the entrance end, the electrical connection portion includes a curved surface, and the inclined surface is adapted to abut the curved surface.

In an embodiment of the disclosure, the fixing base further includes an elastic deformation portion annularly disposed at the pivoting lever. The pivoting lever includes an ear portion corresponding to the elastic deformation portion, and the ear portion is engaged with the elastic deformation portion. When the pivoting lever rotates relative to the fixing base, the elastic deformation portion is pressed by the ear portion to generate an elastic force for the pivoting lever to return to an original position.

In an embodiment of the disclosure, one of the charging arm and the pivoting lever includes a sliding portion at a portion that faces each other, while the other includes a position-limiting slot. The sliding portion extends into the position-limiting slot to limit a rotational angle of the charging arm relative to the pivoting lever.

In an embodiment of the disclosure, the fixing base includes a bottom plate and a first shaft protruding from the bottom plate. The first portion of the pivoting lever is pivotally connected to the fixing base through the first shaft. The first end portion of the charging arm includes a second shaft. The second portion of the pivoting lever is pivotally connected to the charging arm through the second shaft. An extension direction of the first shaft is parallel to an extension direction of the second shaft.

Based on the above, the charge device of the disclosure includes the fixing base, the pivoting lever, and the charging arm. The charging arm is able to rotate relative to the pivoting lever, and the pivoting lever is able to rotate relative to the fixing base. In this way, when the autonomous mobile device is in the process of moving to the charge device, the charge device may have a larger rotational angle to match the position of the autonomous mobile device, so that the charge device and the autonomous mobile device are smoothly aligned, and charging is carried out stably.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the descriptions, serve to explain the principles of the disclosure.

FIG. 4B is a schematic view of a pivoting lever of the charge device in FIG. 4A rotated with respect to the fixing base.

DETAILED DESCRIPTION OF THE EMBODIMENTS

Figure 1A:
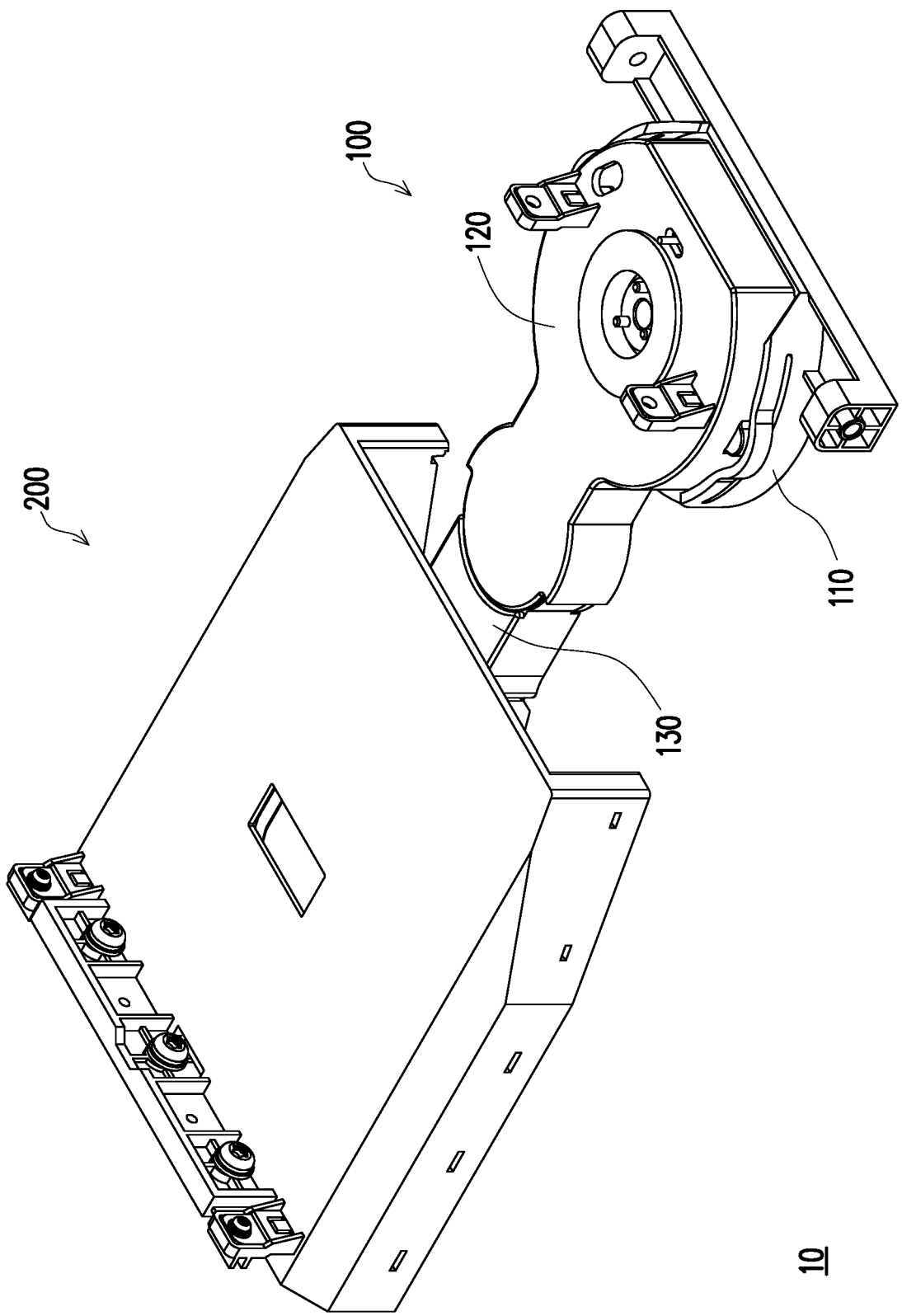
FIG. 1A is a three-dimensional schematic view of a charging system according to an embodiment of the disclosure.
Figure 1B:
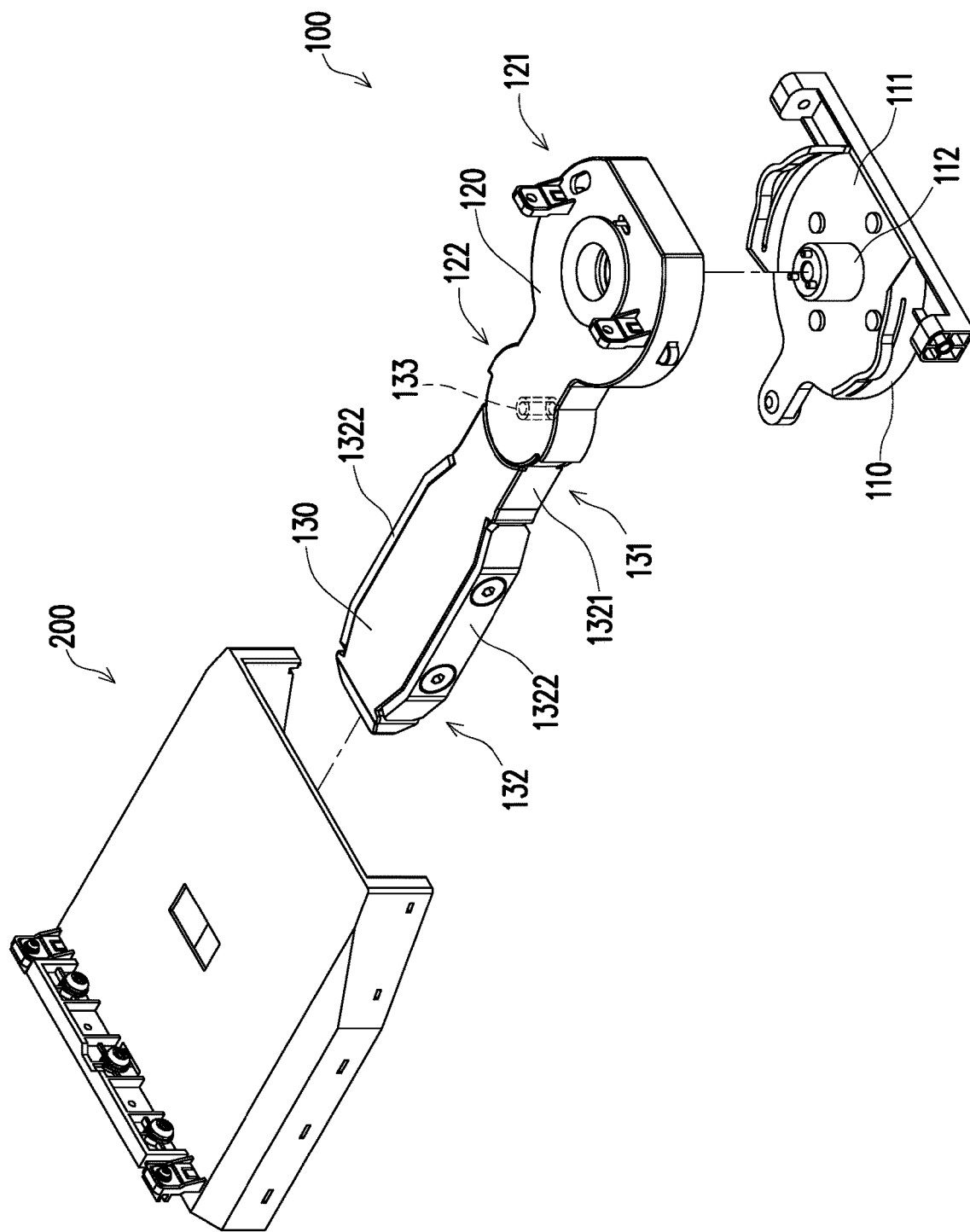
FIG. 1B is an exploded schematic view of the charging system in FIG. 1A.
Figure 2A:
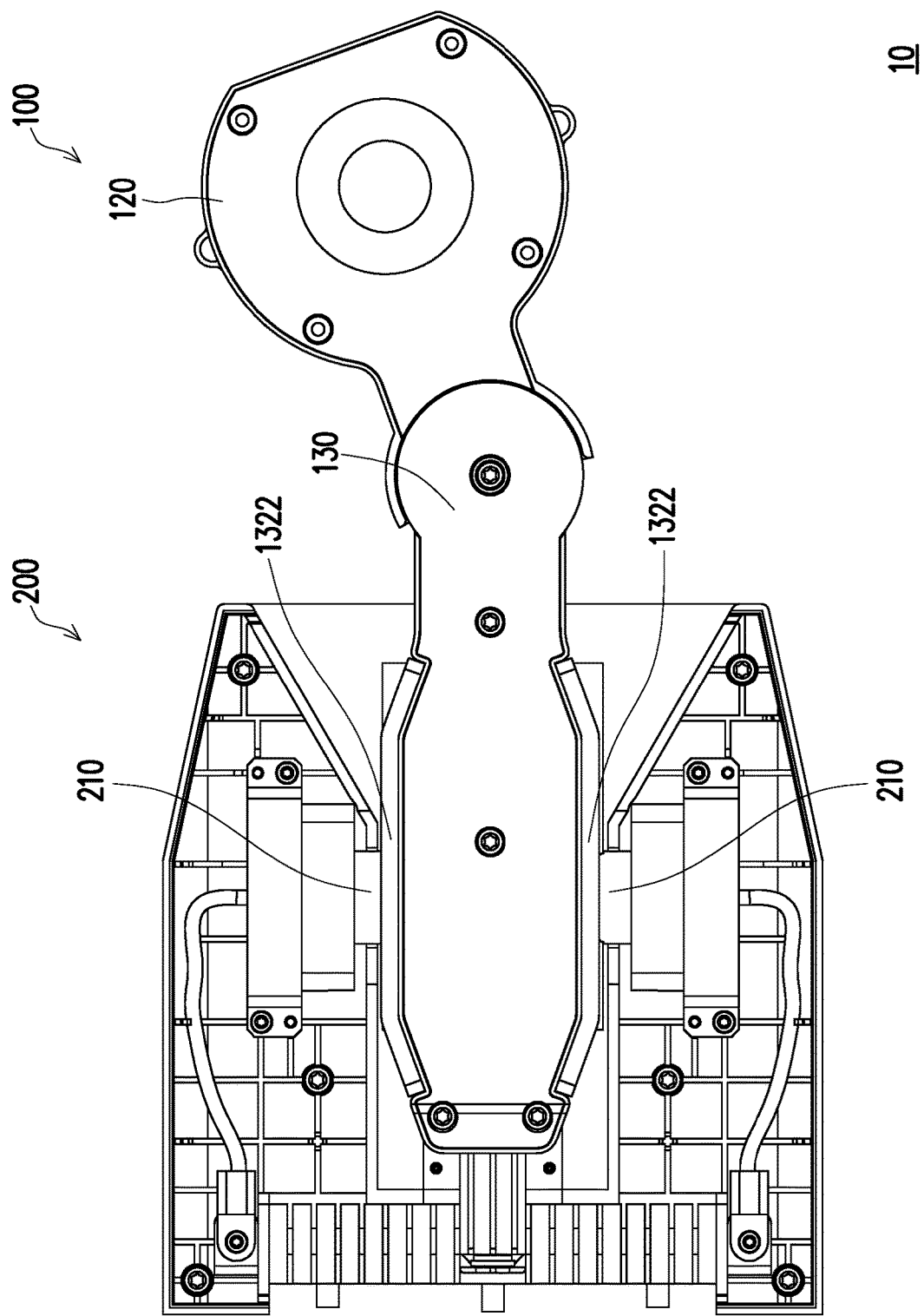
FIGS. 2A and 2B are bottom schematic views of the charging system in FIG. 1A in different states.
Figure 2B:
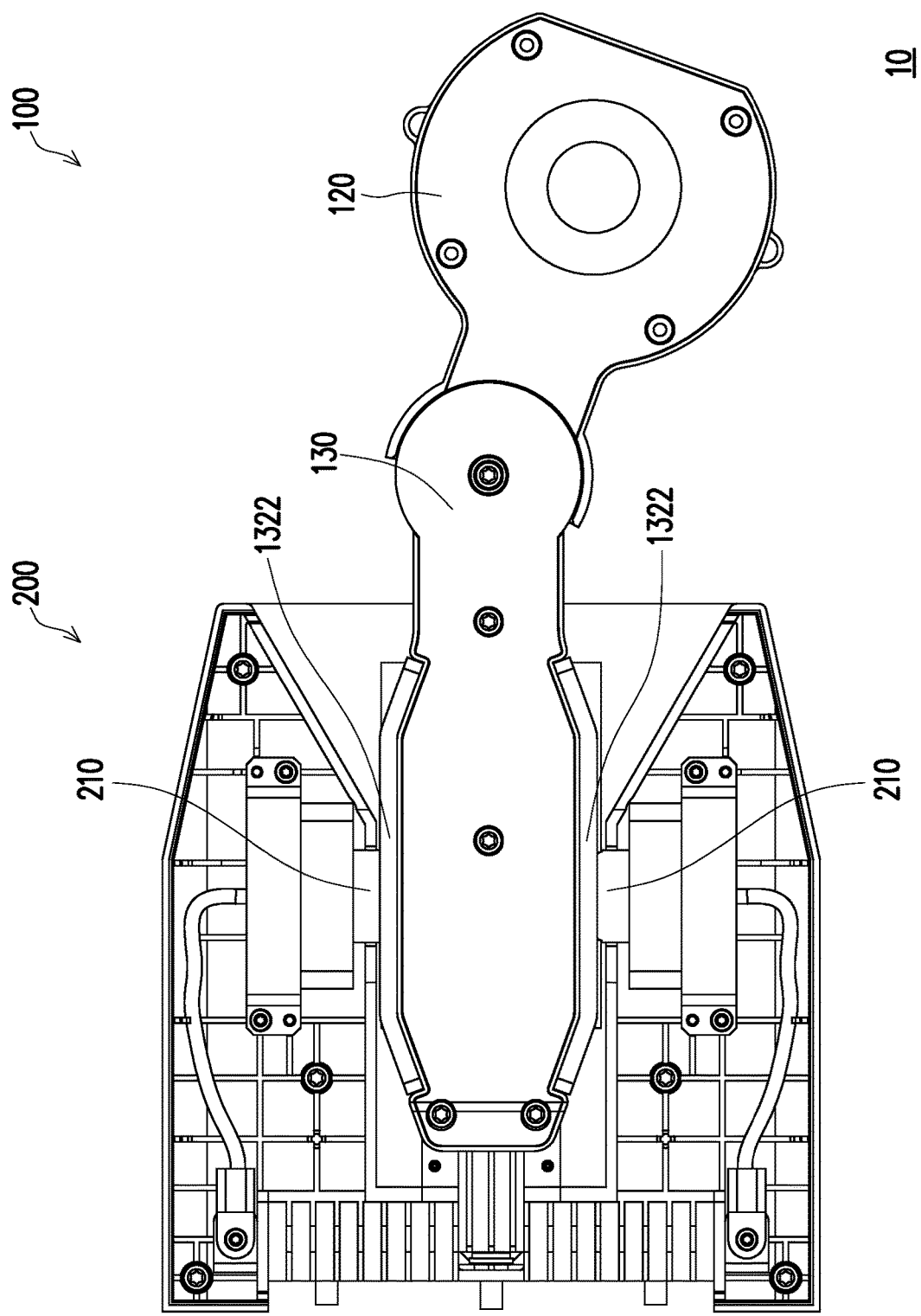

FIG. 1A is a three-dimensional schematic view of a charging system according to an embodiment of the disclosure. FIG. 1B is an exploded schematic view of the charging system in FIG. 1A. FIGS. 2A and 2B are bottom schematic views of the charging system in FIG 1A in different states. It should be noted that a fixing base 110 is omitted in FIGS. 2A and 2B to show a pivoting lever 120 more clearly.

With reference to FIGS. 1A to 2B, a charging system 10 of the embodiment includes a charge device 100 and an autonomous mobile device 200. The charge device 100 is able to charge the autonomous mobile device 200. Here, the autonomous mobile device 200 is, for example, a high-current robot, but is not limited thereto. It should be noted that, in the embodiment, only a portion of a charging terminal of the autonomous mobile device 200 is illustrated, and the portion of the robot above the portion of the charging terminal is omitted to facilitate the description.

In the embodiment, the charge device 100 includes a fixing base 110, a pivoting lever 120, and a charging arm 130. As shown in FIG. 1B, in the embodiment, the charging arm 130 includes two opposite side walls 1321 located at the second end portion 132, and two electrical connection portions 1322 located at the two side walls 1321. The autonomous mobile device 200 includes two electrode modules 210 (FIG. 2A) opposite to each other. In the embodiment, the charge device 100 may be set up at a location by the fixing base 110. The autonomous mobile device 200 is able to automatically move to the location and dock with the charging arm 130 of the charge device 100. At this time, the electrical connection portions 1322 are able to be electrically connected to the autonomous mobile device 200 for charging.

In addition, the electrical connection portions 1322 of the charging arm 130 may be electrically connected to a power terminal (not illustrated) close to the fixing base 110 by a wire (not illustrated) to provide power to the autonomous mobile device 200.

In the embodiment, the pivoting lever 120 includes a first portion 121 and a second portion 122. The first portion 121 is pivotally connected to the fixing base 110. The charging arm 130 includes a first end portion 131 and a second end portion 132 opposite to each other. The first end portion 131 is pivotally connected to the second portion 122. In the embodiment, the first portion 121 and the second portion 122 are integrated as one, but the first portion 121 and the second portion 122 may also be two components fixed together. The first portion 121 and the second portion 122 are not limited thereto.

In detail, the fixing base 110 includes a bottom plate 111 and a first shaft 112 protruding from the bottom plate 111. The first portion 121 of the pivoting lever 120 is pivotally connected to the fixing base 110 through the first shaft 112. The first end portion 131 of the charging arm 130 includes a second shaft 133. The second portion 122 of the pivoting lever 120 is pivotally connected to the charging arm 130 through the second shaft 133. An extension direction of the first shaft 112 is parallel to an extension direction of the second shaft 133. Of course, in other embodiments, the form in which the pivoting lever 120 is pivotally connected to the fixing base 110 and the form in which the charging arm 130 is pivotally connected to the pivoting lever 120 are not limited to the above.

With reference to FIGS. 2A and 2B, the charging arm 130 is able to swing downward or upward with respect to the surface of the figures. The charge device 100 of the embodiment may increase a swinging range of the charging arm 130 through the design of the first shaft 112 (FIG. 1B) and the second shaft 133 (FIG. 1B), so that the maximum allowable offset between the fixing base 110 and the second end portion 132 of the charging arm 130 (that is, the maximum allowable offset between the fixing base 110 and the autonomous mobile device 200) may reach a degree between approximately positive 30 mm and negative 30 mm. Therefore, the charge device 100 is able to have a larger mobility to smoothly align with the autonomous mobile device 200.

For example, FIG. 2A shows a state where the autonomous mobile device 200 is offset downward by 28.5 mm with respect to the fixing base 110, and the charging arm 130 is rotated by positive 20 degrees. FIG. 2B shows a state where the autonomous mobile device 200 is offset upward by 28.5 mm with respect to the fixing base 110, and the charging arm 130 is rotated by negative 20 degrees.

In the above configuration, the fixing base 110 is fixed, the charging arm 130 is able to rotate relative to the pivoting lever 120, and the pivoting lever 120 is able to rotate relative to the fixing base 110. In this way, when the autonomous mobile device 200 is in the process of being docked to the second end portion 132 of the charging arm 130, the charge device 100 may have a larger rotational angle to match the position of the autonomous mobile device 200, so that the charge device 100 and the autonomous mobile device 200 are smoothly aligned and charging is carried out stably.

Figure 3:
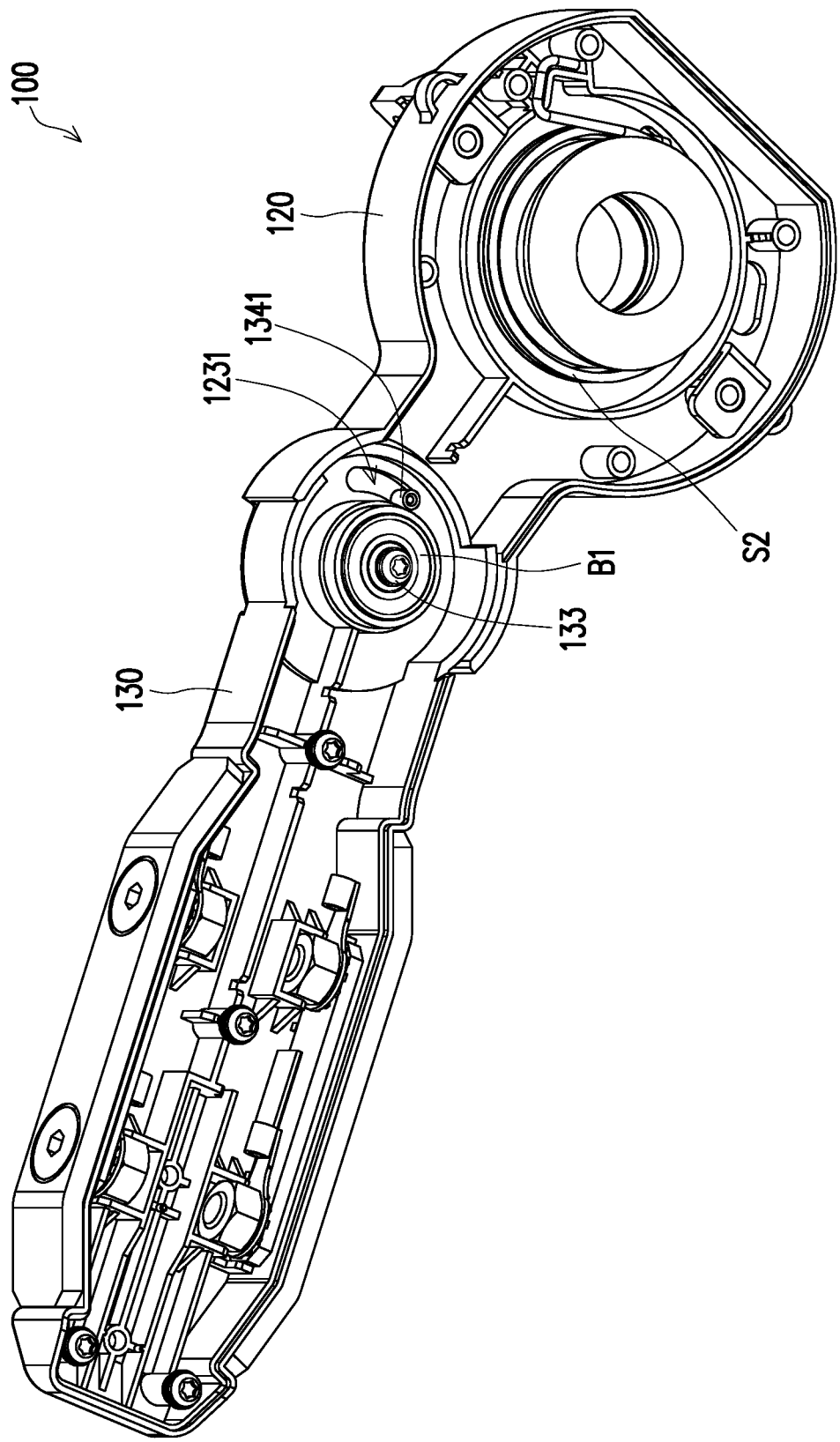
FIG. 3 is a three-dimensional schematic view of the charge device in FIG. 1A from another perspective.

FIG. 3 is a three-dimensional schematic view of the charge device in FIG. 1A from another perspective. It should be noted that FIG. 3 is a bottom view of FIG. 1A, and illustrations of a lower casing body of the pivoting lever 120, a lower casing body of the charging arm 130, and the fixing base 110 are omitted to show the internal structures of the pivoting lever 120 and the charging arm 130 more clearly.

With reference to FIG. 3, in the embodiment, the first end portion 131 of the charging arm 130 includes a sliding portion 1341, and the second portion 122 of the pivoting lever 120 includes a position-limiting slot 1231. The sliding portion 1341 extends into the position-limiting slot 1231, and is adapted to move along the position-limiting slot 1231 to limit a rotational angle of the charging arm 130 relative to the pivoting lever 120.

This design prevents excessive deflection of the charging arm 130, which causes the charging arm 130 being unable to smoothly align with the autonomous mobile device 200 (FIG. 1A). Or, because of the excessive deflection of the charging arm 130, it is difficult to return the charging arm 130 to its original position (that is, the center position without deflection).

In other embodiments, one of the first end portion 131 of the charging arm 130 and the second portion 122 of the pivoting lever 120 may include the sliding portion 1341, while the other includes the position-limiting slot 1231, but the disclosure is not limited by the above.

In addition, in the embodiment, the charging arm 130 is returned to its original position, for example, by using a torsion spring (not illustrated) configured at the second shaft 133 to allow the charging arm 130 to return to its original position when receiving no force, but the disclosure is not limited thereto. On the other hand, in the embodiment, configuring the torsion spring and a bearing B1 at the second shaft 133 may allow the charging arm 130 to rotate smoothly, but the disclosure is not limited thereto.

With reference to FIG. 3, by configuring a torsion spring S2 on the first shaft 112 (FIG. 1B), the pivoting lever 120 may be returned to its original position after being rotated by a large angle and released when receiving no force. A charge device 100A of the following embodiment further includes a structure that enables the pivoting lever 120 to be smoothly returned to its original position when released after being rotated by a small angle.

Several embodiments will be described in the following. The following embodiments will use the reference numerals/symbols and a part of the content of the foregoing embodiment. The same numerals/symbols are used to represent the same or similar elements, and the description of the same technical content is omitted. Reference is drawn to the foregoing embodiment for the description of the omitted part, and the same description will not be reiterated in the following embodiments.

Figure 4A:
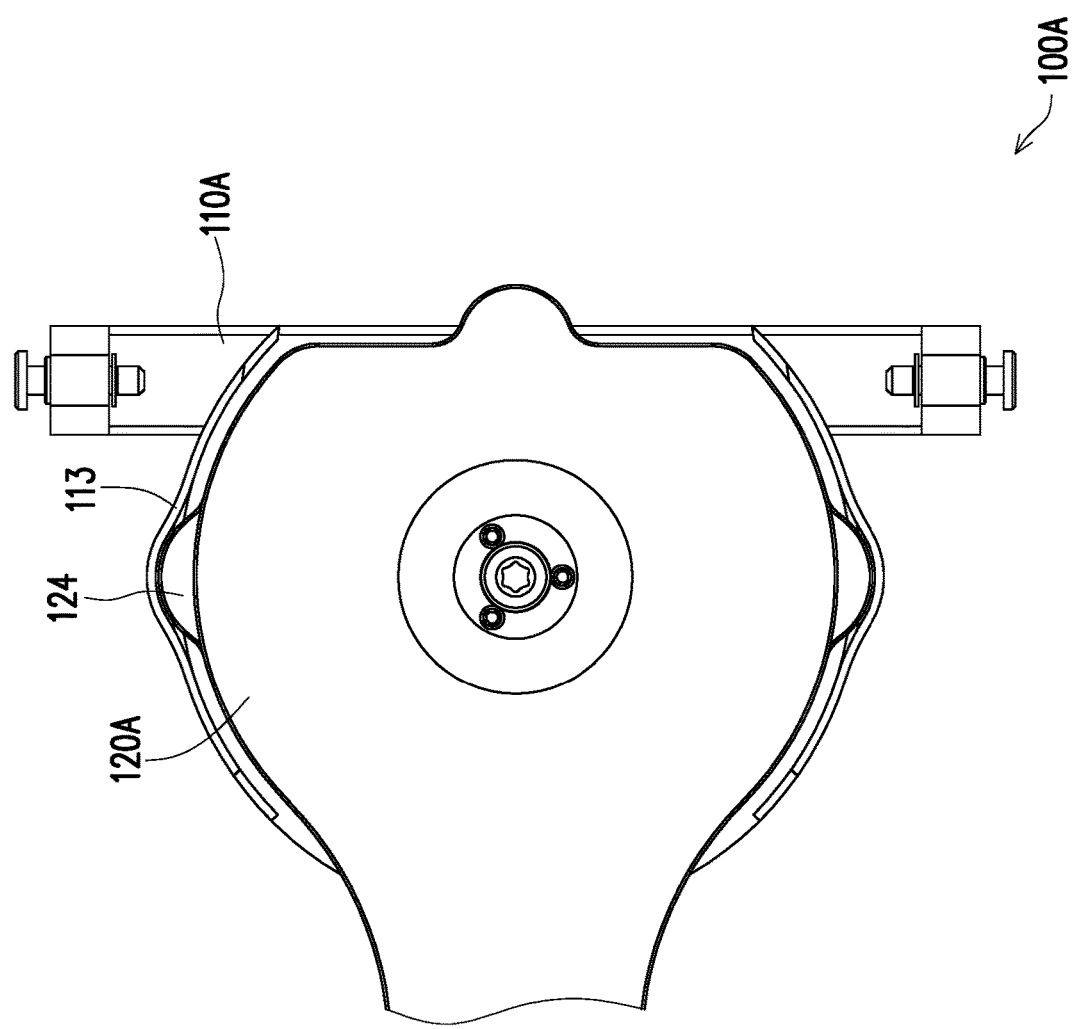
FIG. 4A is a schematic view of a charge device according to another embodiment of the disclosure.

FIG. 4A is a schematic view of a charge device according to another embodiment of the disclosure. FIG. 4B is a schematic view of a pivoting lever of the charge device in FIG. 4A rotated with respect to the fixing base. With reference to FIGS. 4A and 4B, in the embodiment, a fixing base 110A includes an elastic deformation portion 113 annularly disposed at a pivoting lever 120A. The pivoting lever 120A includes an ear portion 124 corresponding to the elastic deformation portion 113, and the ear portion 124 is engaged with the elastic deformation portion 113. When the autonomous mobile device 200 is in the process of being docked with the charging arm 130, the pivoting lever 120A may rotate relative to the fixing base 110A, and as shown in FIG. 4B, the elastic deformation portion 113 is pressed by the ear portion 124, so that the elastic deformation portion 113 is deformed and an elastic force is generated.

In this way, when the autonomous mobile device 200 is separated from the charge device 100A, the elastic force is released, and the elastic deformation portion 113 pushes against the ear portion 124 to return the pivoting lever 120A to its original position, as shown in FIG. 4A.

In the embodiment, the elastic deformation portion 113 is actually a side casing of the fixing base 110A, and includes a portion protruding in a direction away from a first shaft 112A to accommodate the ear portion 124. In the embodiment, the number of protruding portion of the elastic deformation portion 113 is illustrated as two, and the number of the ear portion 124 is illustrated as two. However, in other embodiments, it suffices as long as the number of the elastic deformation portion 113 and the number of the ear portion 124 match each other, and the disclosure is not particularly limited by the numbers thereof.

In addition, a charging system 10A of the following embodiment will further increase the smoothness of the alignment between an autonomous mobile device 200A and the charge device 100A.

Figure 5:
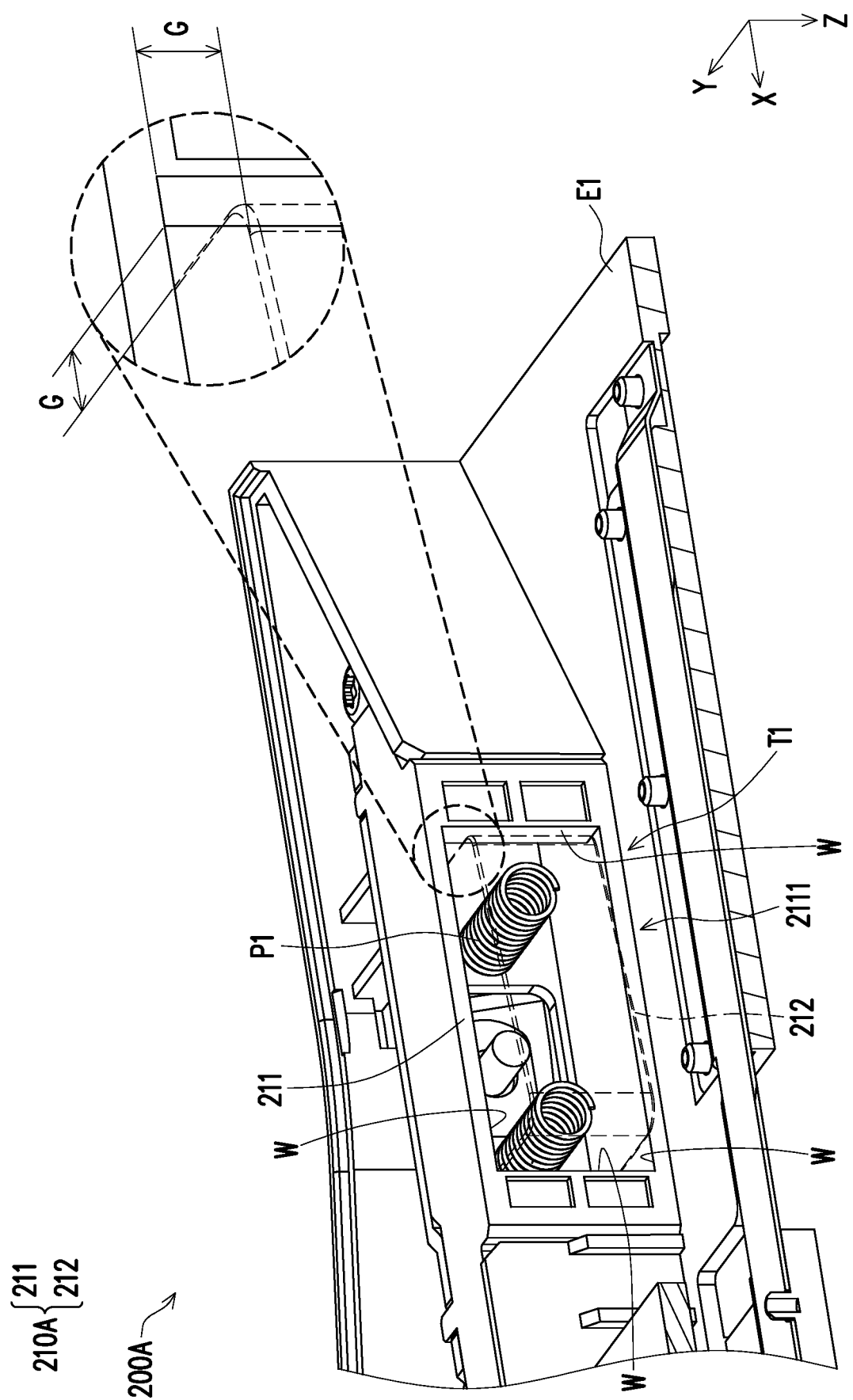
FIG. 5 is a cross-sectional schematic view of an autonomous mobile device according to another embodiment of the disclosure.
Figure 6A:
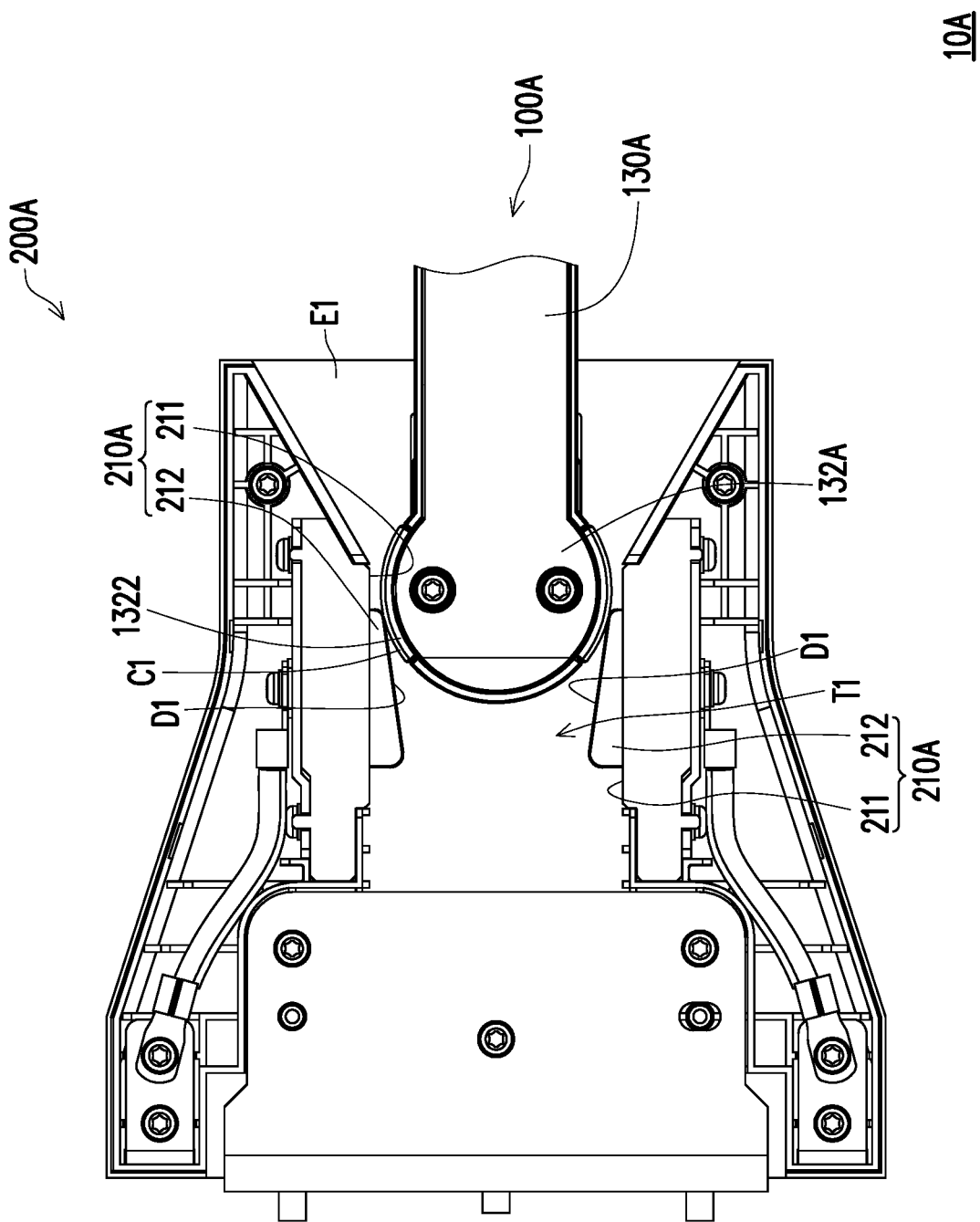
FIGS. 6A to 6C are bottom schematic views of different states of the autonomous mobile device in FIG. 5 being used with the charge device.
Figure 6B:
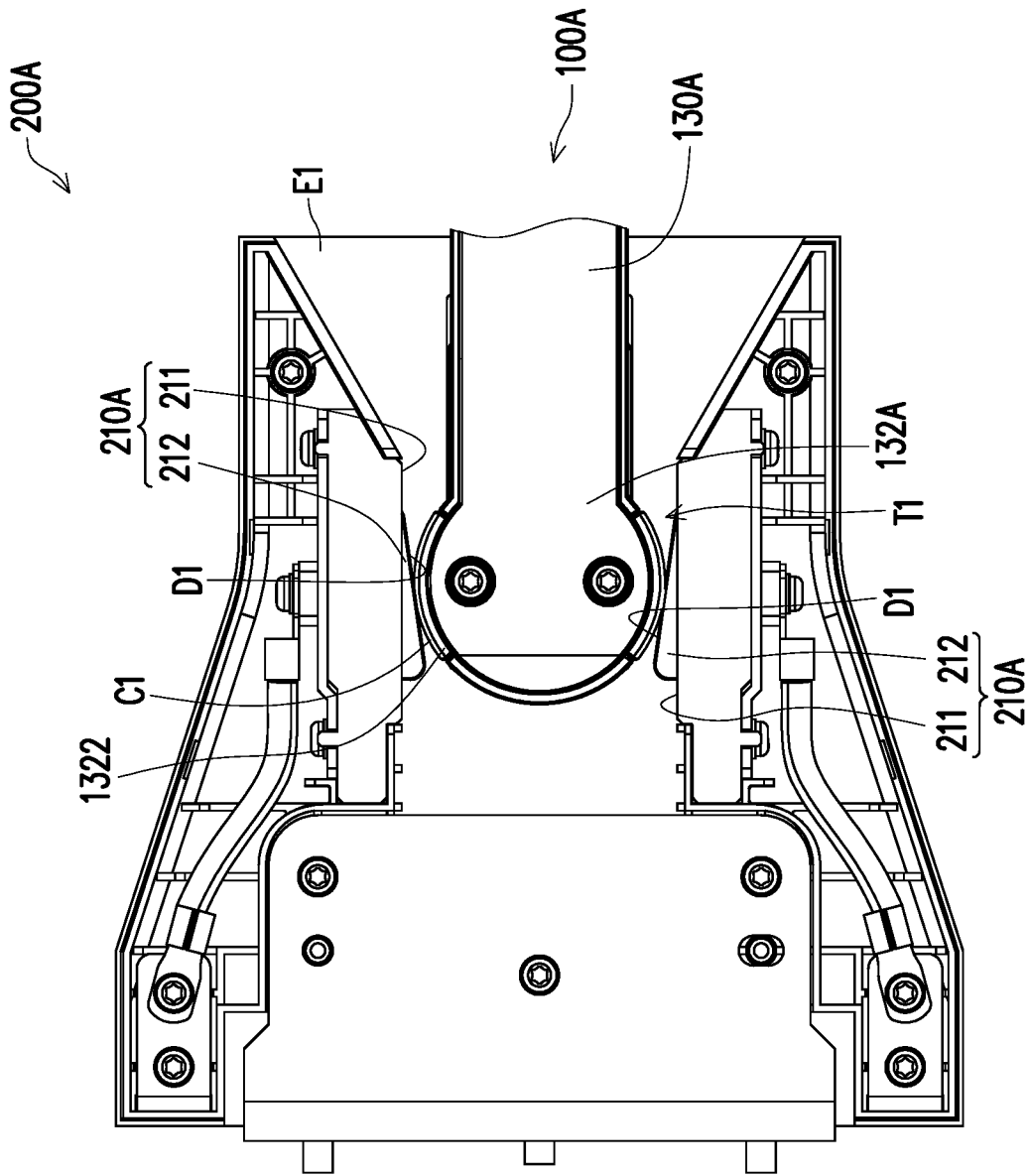
Figure 6C:
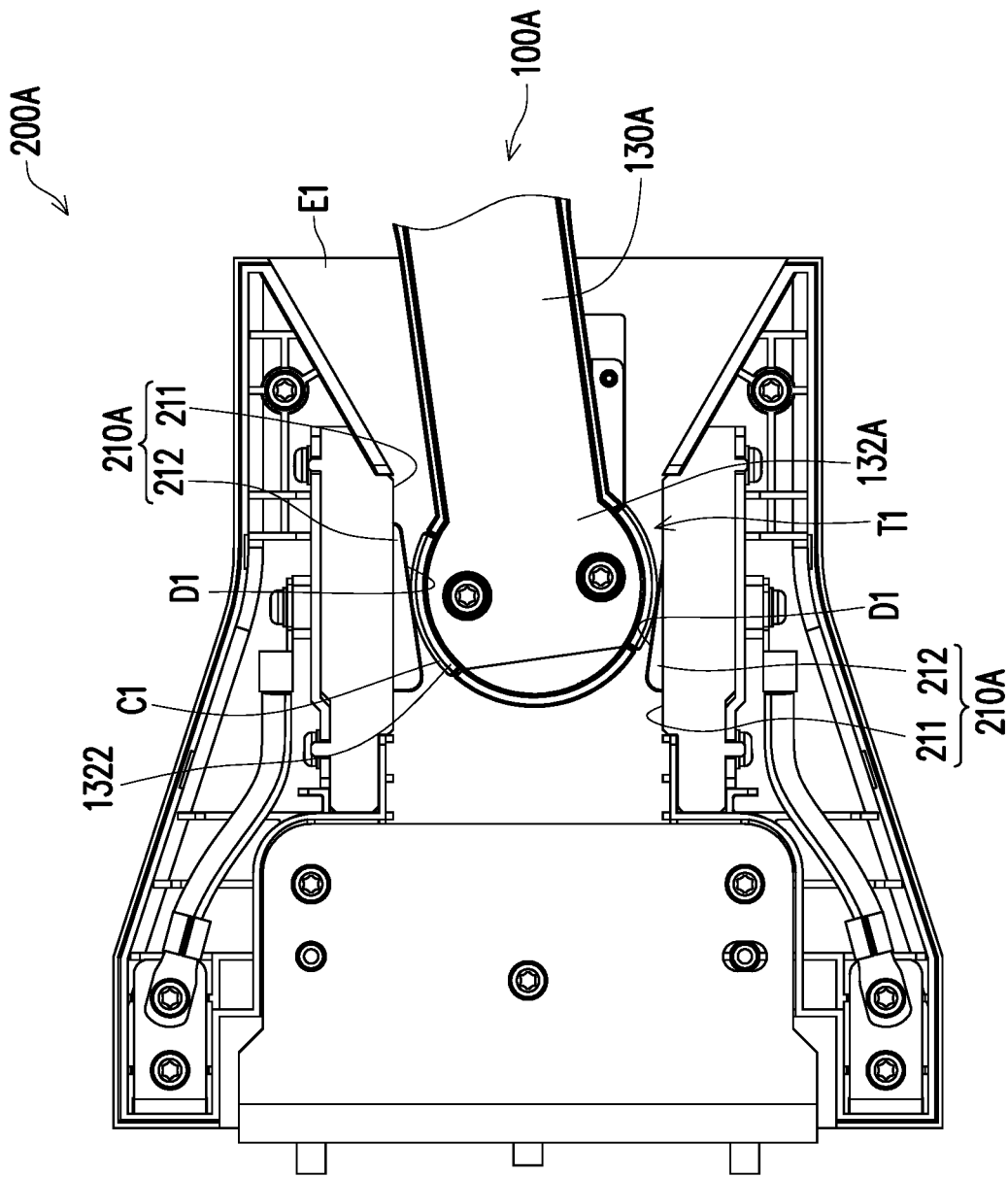

FIG. 5 is a cross-sectional schematic view of an autonomous mobile device according to another embodiment of the disclosure. FIGS. 6A to 6C are bottom schematic views of different states of the autonomous mobile device in FIG. 5 being used with the charge device. It should be noted that an electrode portion 212 in FIG. 5 is illustrated with a dotted line to more clearly show the internal structure of an electrode module 210A. At the same time, a Cartesian coordinate system with X, Y and Z axes is provided in the figures to facilitate description.

With reference to FIG. 6A first, in the embodiment, the two electrode modules 210A of the autonomous mobile device 200A constitute a track T1. The track T1 includes an entrance end E1, to allow a second end portion 132A of a charging arm 130A to extend into the track T1 from the entrance end E1, so that the electrode modules 210A are electrically connected to the electrical connection portions 1322. The second end portion 132A of the charging arm 130A is circular so that the electrical connection portion 1322 includes a curved surface C1.

In addition, in the embodiment, the electrode portion 212 of the autonomous mobile device 200A includes an inclined surface D1 facing the entrance end E1. As shown in FIGS. 6A to 6B, when the second end portion 132A of the charging arm 130A extends into the track T1, the curved surface C1 of the electrical connection portion 1322 is able to abut the inclined surface D1 of the electrode portion 212. With such design, as shown in FIG. 6C, when the charging arm 130A enters the track T1 obliquely, the electrical connection portions 1322 are still able to be smoothly docked to the electrode portions 212 to reduce the occurrence of being stuck.

In addition, with reference to FIG. 5, in detail, the electrode module 210A includes a casing base 211 and the electrode portion 212. The casing base 211 includes an opening 2111 facing the track T1 and multiple wall surfaces W surrounding the opening 2111.

The electrode portion 212 of the embodiment is adjustably configured at the opening 2111. Specifically, the electrode portion 212 is adjustably configured at the opening 2111 by a spring P1, but in other embodiments, the configuration of the electrode portion 212 is not limited thereto.

There is a gap G between the electrode portion 212 and the corresponding wall surface W, therefore the electrode portion 212 may have a larger movement margin. Specifically, the electrode portion 212 includes the gaps G with the wall surfaces W in both X direction and Z direction.

In this way, when the second end portion 132A of the charging arm 130A extends into the track T1 of the autonomous mobile device 200A, the electrical connection portions 1322 of the charging arm 130A may press against the electrode portions 212 of the autonomous mobile device 200A. The electrode portions 212 at this time are able to move in the X direction or the Z direction to change the size of the gaps or to move in a Y direction through the spring P1.

As shown in FIGS. 6A and 6B, when the electrode portions 212 of the autonomous mobile device 200A are pressed by the electrical connection portions 1322 of the charging arm 130A, a portion of the electrode portion 212 may retract into the opening 2111 (FIG. 5) to allow the charging arm 130A to be able to smoothly enter the track T1, reducing the occurrence of being stuck.

On the other hand, as shown in FIG. 6C, if an offset is generated by the autonomous mobile device 200A, the two electrode portions 212 are pressed by the electrical connection portions 1322 to different degrees, and the degrees to which the two electrode portions 212 are retracted into the opening 2111 are also different. For example, since the electrode portion 212 near the bottom of the figure receives applied greater force, a greater portion of the electrode portion 212 is being retracted into the opening 2111. In this way, even if there is an offset between the autonomous mobile device 200A and the charging arm 130A, the charging arm 130A is also able to smoothly enter the track T1, therefore reducing the occurrence of being stuck.

In summary, the charge device of the disclosure includes the fixing base, the pivoting lever, and the charging arm. The charging arm is able to rotate relative to the pivoting lever, and the pivoting lever is able to rotate relative to the fixing base, which increases the swinging range of the charging arm. In this way, when the autonomous mobile device is in the process of moving to the charge device, the charge device can be provided with a larger rotational angle to match the offset of the position of the autonomous mobile device, so that the charge device and the autonomous mobile device are smoothly aligned and charging is carried out stably. In an embodiment, the fixing base includes the elastic deformation portion, the pivoting lever includes the ear portion corresponding to the elastic deformation portion, and the elastic deformation portion is able to be deformed by the pressing of the ear portion and generate an elastic force. Therefore, when the autonomous mobile device is separated from the charge device, the elastic force is released so that the pivoting lever can be reliably rotated to its original position. In an embodiment, the second end portion of the charging arm of the disclosure is circular so that the electrical connection portions have curved surfaces. The electrode portions of the autonomous mobile device have inclined surfaces, and the curved surfaces of the electrical connection portions are able to abut against the inclined surfaces of the electrode portions. With such design, when the charging arm enters the track obliquely, the electrical connection portions are still able to be smoothly docked to the electrode portions to reduce the occurrence of being stuck. In addition, there are gaps between the electrode portions and the corresponding wall surfaces, so that the electrode portions can be provided with a larger movement margin. Therefore, when the electrode portions of the autonomous mobile device are being pressed by the electrical connection portions of the charging arm, the electrode portions can move in the X, Y, and Z directions in accordance with the charging arm, and reduce the occurrence of being stuck.

Although the disclosure has been disclosed with the foregoing exemplary embodiments, it is not intended to limit the disclosure. Any person skilled in the art can make various changes and modifications within the spirit and scope of the disclosure. Accordingly, the scope of the disclosure is defined by the claims appended hereto and their equivalents.

What is claimed is:

1. A charge device, comprising:
a fixing base, comprising a bottom plate and a first shaft protruding from the bottom plate;
a charging arm, comprising a first end portion and a second end portion opposite to each other, wherein the first end portion of the charging arm comprises a second shaft, an extension direction of the first shaft is parallel to an extension direction of the second shaft, and the extension direction of the first shaft and the extension direction of the second shaft are perpendicular to a bottom surface of the bottom plate; and
a pivoting lever, comprising a first portion and a second portion, wherein the first portion is pivotally connected to the fixing base through the first shaft, the pivoting lever is adapted to rotate relative to the fixing base, the second portion is pivotally connected to the charging arm through the second shaft, and the charging arm is adapted to rotate relative to the pivoting lever.

2. The charge device according to claim 1, wherein the fixing base further comprises at least one elastic deformation portion, the pivoting lever comprises at least one ear portion, the at least one ear portion is engaged with the corresponding at least one elastic deformation portion, and when the pivoting lever rotates relative to the fixing base, the at least one elastic deformation portion is pressed by the at least one ear portion to generate an elastic force for the pivoting lever to return to an original position.

3. The charge device according to claim 1, wherein one of the first end portion of the charging arm and the second portion of the pivoting lever comprises a sliding portion, while the other comprises a position-limiting slot, the sliding portion extends into the position-limiting slot and is adapted to move along the position-limiting slot to limit a rotational angle of the charging arm relative to the pivoting lever.

4. The charge device according to claim 1, wherein the charging arm comprises two opposite side walls located at the second end portion and two electrical connection portions located on the two side walls.

5. A charging system, comprising:
a charge device, comprising:
a fixing base, comprising a bottom plate and a first shaft protruding from the bottom plate;
a pivoting lever, comprising a first portion and a second portion, wherein the first portion is pivotally connected to the fixing base through the first shaft; and
a charging arm, comprising a first end portion and a second end portion opposite to each other, wherein the first end portion of the charging arm comprises a second shaft, an extension direction of the first shaft is parallel to an extension direction of the second shaft, and the extension direction of the first shaft and the extension direction of the second shaft are perpendicular to a bottom surface of the bottom plate, wherein the charging arm is pivotally connected to the second portion through the second shaft; and an autonomous mobile device, adapted to be electrically connected to the charging arm, wherein when the autonomous mobile device is in a process of being docked to the second end portion of the charging arm, the charging arm is adapted to rotate relative to the pivoting lever, and the pivoting lever is adapted to rotate relative to the fixing base, so that the charge device is aligned with the autonomous mobile device.

6. The charging system according to claim 5, wherein the charging arm comprises two opposite side walls located at the second end portion and two electrical connection portions located at the two side walls, the autonomous mobile device comprises two electrode modules opposite to each other, the two electrode modules constitute a track, the second end portion of the charging arm is adapted to extend into the track, so that each of the electrode modules is respectively electrically connected to the corresponding electrical connection portion.

7. The charging system according to claim 6, wherein each of the electrode modules further comprises a casing base and an electrode portion, the casing base comprises an opening facing the track and a plurality of wall surfaces surrounding the opening, the electrode portions are adjustably configured at the opening, and each of the electrode portions and the corresponding wall surface have a plurality of gaps therebetween, when the second end portion of the charging arm extends into the track of the autonomous mobile device, the electrical connection portions of the charging arm press against the electrode portions of the autonomous mobile device to change a size of the gaps.

8. The charging system according to claim 7, wherein the track comprises an entrance end to allow the second end portion of the charging arm to extend into, the electrode portion comprises an inclined surface facing the entrance end, the electrical connection portion comprises a curved surface, and the inclined surface is adapted to abut the curved surface.

9. The charging system according to claim 5, wherein the fixing base further comprises an elastic deformation portion annularly disposed at the pivoting lever, the pivoting lever comprises an ear portion corresponding to the elastic deformation portion, and the ear portion is engaged with the elastic deformation portion, when the pivoting lever rotates relative to the fixing base, the elastic deformation portion is pressed by the ear portion to generate an elastic force for the pivoting lever to return to an original position.

10. The charging system according to claim 5, wherein one of the charging arm and the pivoting lever comprises a sliding portion at a portion that faces each other, while the other comprises a position-limiting slot, and the sliding portion extends into the position-limiting slot to limit a rotational angle of the charging arm relative to the pivoting lever.

* * * * *